United States Patent
Defaye et al.

(10) Patent No.: US 6,570,009 B1
(45) Date of Patent: May 27, 2003

(54) REGION-SELECTIVE METHOD FOR PREPARING CYCLODEXTRIN C-6 MONOSULPHONYL DERIVATIVES

(75) Inventors: Jacques Defaye, Saint Ismier (FR); Serge Crouzy, Saint Etienne de Crossey (FR); Nicolas Evrard, Meylan (FR); Ho Law, Grenoble (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 09/700,707

(22) PCT Filed: May 25, 1999

(86) PCT No.: PCT/FR99/01217

§ 371 (c)(1),
(2), (4) Date: Dec. 20, 2000

(87) PCT Pub. No.: WO99/61483

PCT Pub. Date: Dec. 2, 1999

(30) Foreign Application Priority Data

May 26, 1998 (FR) .............................. 98 06605

(51) Int. Cl.$^7$ .......................... C08B 37/16; C07H 13/12; C07H 23/00; C07H 1/00
(52) U.S. Cl. ....................... 536/103; 536/118; 536/121; 536/1.11
(58) Field of Search ............................. 536/103, 118, 536/1.11, 121

(56) References Cited

U.S. PATENT DOCUMENTS 6,080,733 A    6/2000   Defaye et al.

FOREIGN PATENT DOCUMENTS

| EP | 0 403 366 | 12/1990 |
| WO | WO 95/19994 | 7/1995 |
| WO | WO 95/21870 | 8/1995 |

OTHER PUBLICATIONS

W. Lautsch, et al., Kolloid–Ztg, vol. 135, pps. 134–136 "Tosyl– Und Mesyl–Derivate Der Cyclodextrine (I)," 1954.
R.C. Petter, et al., J. Am. Chem. Soc. vol. 112, No. 10, pps. 3860–3868, "Cooperative Binding by Aggregated Mono–6–(Alkylamino)–β–cyclodextrins," 1990.
Y. Matsui, et al., Bulletin of the Chemical Society of Japan, vol. 48, No. 7, pps. 2187–2191, "The Formation and Structure of Copper(II) Complexes with Cyclodextrins in an Alkaline Solution," Jul. 1975.
P.R. Ashton, et al., J. Org. Chem., vol. 56, No. 26, pps. 7274–7280, "Per–3,6–Anhydro–α–Cyclodextrin and Per–3, 6–Andhydri–β–Cyclodextrin," 1991.
M. Bost, et al., Journal of Inclusion Phenomena and Molecular Recognition in Chemistry, vol. 29, pps. 57–63, "The Hemolytic Properties of Chemically Modified Cyclodextrins," 1997.

F. Cramer, et al., Chem. Ber., vol. 102, pps. 494–508, "ORD–Spektren Und Konformation Der Glucose–Einheiten in Cyclodextrinen," 1969.
J. Defaye, et al., Carbohydrate Research, vol. 192, pps. 251–258, "Branched Thiocyclomalto–Oligosaccharides: Synthesis and Properties of 6–S–α– And 6–S–β–D Glucopyranosyl–6–Thiocyclomaltoheptaose," 1989.
R. Fuchs, et al., Angew. Chem. Int. Ed. Engl., vol. 32, No. 6, pps. 852–854, "Multilinear Sandwich–Type Complexes of Deprotonated β–Cyclodextrin and Copper (II) Ions," 1993.
P. Klüfers, Chem. Eur. J., vol. 3, No. 4, pps. 601–608, "Homoleptic Cuprates(II) with Multiply Deprotonated β–Cyclodextrin Ligands," 1997.
V. Lainé, et al., J. Chem. Soc. Perkin Trans., vol. 2, pps. 1479–1487, "Inclusion and Solubilization Properties of 6–S–Glycosyl–6–Thio Derivatives of β–Cyclodextrin," 1995.
Y. Matsui, et al., Bulletin of the Chemical Society of Japan, vol. 51, No. 10, pps. 3030–3034, "The Binding and Catalytic Properties of a Positively Charged Cyclodextrin," 1978.
Y. Matsui, et al., Chemistry Letters, pps. 1037–1040, "Catalytic Properties of A Cu(II) Complex with a Modified Cyclodextrin," 1976.
L.D. Melton, et al., Carbohydrate Research, vol., 18, pps. 29–37, "Synthesis of Monosubstituted Cyclohexaamyloses," 1971.
I. Tabushi, et al., Journal of the American Chemical Society, vol. 99, No. 21, pps. 7100–7102, "Cyclodextrin Flexibly Capped with Metal Ion," Oct. 12, 1977.
K. Takahashi, et al., Tetrahedron Letters, vol. 25, No. 31, pps. 3331–3334, "Monotosylated α– And β–Cyclodextrins Prepared in an Alkaline Aqueous Solution," 1984.
S. Umezawa, et al., Bulletin of the Chemical Society Of Japan, vol. 41, No. 2, pps. 464–468, "Studies Of Aminosugars. XVIII. Synthesis of Amino Derivatives Of Schardinger α–Dextrin And Raffinose," 1968.

Primary Examiner—James O. Wilson
Assistant Examiner—Everett White
(74) Attorney, Agent, or Firm—Oblon, Spivak, McClelland, Maier & Neustadt, P.C.

(57) ABSTRACT

The invention relates to a highly regioselective method for preparing a derivative of cyclodextrin, β-cyclodextrin in particular, monosulfonylated at C-6, in which said cyclodextrin is caused to react with a sulfonylation agent, in an alkaline aqueous solution, in the presence of a metal salt able to form a co-ordination complex with the secondary hydroxyl groups of the cyclodextrin, and after the reaction said cyclodextrin derivative monosulfonylated at C-6 is recovered from the reaction mixture.

The monosulfonylated derivatives of cyclodextrins find particular application as starting material for access to monofunctionalized derivatives of cyclodextrins.

16 Claims, No Drawings

REGION-SELECTIVE METHOD FOR PREPARING CYCLODEXTRIN C-6 MONOSULPHONYL DERIVATIVES

This application is a 371 of PCT/FR99/01217, filed May 25, 1999.

The present invention relates to a regioselective method for preparing cyclodextrin derivatives, of beta cyclodextrin in particular, monosulfonylated at C-6.

Monosulfonylated derivatives of cyclodextrins find particular application as starting material for access to monofunctionalized derivatives of cyclodextrins.

Cyclodextrins, or cyclomaltooligosaccharides are natural products obtained by the biotechnological conversion of starch, which is an agricultural resource available in large quantities.

Cyclodextrins, or cyclomaltooligosaccharides are cyclic oligosaccharides which have the property of including within their cavity various molecules whose size is adapted to that of the host structure.

The generally apolar character of these associations leads to the preferential inclusion of structures of hydrophobic type, with which it is possible in particular to achieve solubilization in water of compounds having no or low solubility in these media.

Among the derivatives of cyclodextrins, the cyclodextrin sulfonates, and in particular p-toluenesulfonates, form a class of important derivatives since they can be used to produce nucleophilic substitution reactions on the carbons concerned, and therefore can be used to introduce varied functional groups, azide, amine, halide, thiocyanate, thiol etc., and via such reactive groups, to introduce akyl, alkyl and aryl substituents or further to cause intramolecular reactions (epoxides, 3,6-anhydrides).

These structural changes are widely used to modify the physico-chemical properties of cyclodextrins, in particular their solubility, and their solubilization and inclusion properties.

Hence documents WO-A-95/19994, WO-A-95/21870, EP-A-0403366, PCT/FR97/00447, describe the grafting of glucose, aminoakyl, peptidyl, glycopeptidyl or alkyl substituents by means of oxygen-, sulfur- or thiourea-containing bonds.

In all the cases examined, increases in solubility of the grafted cyclodextrin, and the improvement in solubilization properties are very high and may even reach a factor of 100.

The cytotoxic and especially the haemolytic properties of the grafted cyclodextrins obtained are moreover generally much improved as reported by M. Bost et al. in J. Incl. Phenom. Mol. Recogn., 29 (1997) 57–63.

In more specific manner, among the cyclodextrin sulfonates mentioned above, the monosulfonylated derivatives, and in particular the $6^1$-mono-p-toluenesulfonates form derivatives of choice for access to the monofunctionalized derivatives of cyclodextrins.

The monofunctionalized derivatives of cyclodextrins at the primary alcohol position form a class of cyclodextrin derivatives of particular importance in respect of applications.

Work conducted by V. Lainé et al. in J. Chem. Soc., Perkin Trans.2, 1995, pp 1479–1487 has shown that this type of structure generally has considerably improved inclusion properties compared with the same derivatives involving total substitution of the ring of primary hydroxyls.

This is due to the fact that:
i) The steric hindrance created by persubstitution restricts entry of the included structure if the dynamics of inclusion involve entry through the side of the primary hydroxyls;

ii) The stabilization of the structure included in the cavity frequently uses the formation of hydrogen bonds between one of the primary hydroxyls of cyclodextrin and one of the functional groups of the included structure.

Therefore the monosulfonylated derivatives of cyclodextrins, especially the $6^1$-mono-p-toluene sulfonates, are in particular the compulsory starting material for access to the $6^1$-amino-$6^1$-deoxy-cyclodextrins used to prepare mono-thioureidocyclodextrins, solubilisation agents for pharmacologically active ingredients described in international patent application CNRS PCT/FR97/9700447.

The preparation of sulfonylated compounds of cyclodextrins has been the subject of numerous publications.

Hence, the first tosylates of cyclodextrins were described by Von W. Lautsch et al. in Kolloid-Ztg, 135 (1954) 134, by S. Umezawa and K. Tatsuta in Bull. Chem. Soc., Jpn, 41 (1968) 464, and by F. CRAMER et al. in Chem. Ber. 102 (1969) 494.

All these studies concern regioselective pertosylation tests at the primary alcohol position of cyclodextrins.

Ashton et al. in J. Org. Chem., 56 (1991) 7274–7280 report an improvement in these techniques with which it is possible to obtain per-6-0-p-tolysulfonyl-α and β-cyclodextrins with respective yields of 1% and 5% using an excess of p-toluenesulfonyl chloride reagent in pyridine.

All the above-cited documents therefore concern pertosylation, but as has been seen above, the monosulfonylated derivatives offer particular interest.

It is therefore advantageous to have available a specific synthesis method for said compounds.

The regioselective mono-p-toluenesulfonylation at C-6 of α-cyclodextrin was described for the first time by L. D. Melton and K. L. Slessor in Carbohydr. Res., 18 (1971) 29–37. These authors use p-toluenesulfonyl chloride in pyridine as reagent and purify the mixture of 6-O-p-toluenesulfonylcyclomaltoheptaose obtained by chromatography on an active carbon column.

$6^1$-O-p-tolysulfonylcyclomaltohexaose is obtained with a final yield of 46%.

This technique was subsequently extended to β-cyclodextrin by Y. Matsui et al. in Chem. Lett., (1976) 1037–1040, by I. Tabushi et al., in J. Am. Chem. Soc., 99 (1977) 7100–7102, and by Y. Matsui and A. Okimoto in Bull. Chem. Soc. Jpn., 51 (1978) 3030–3034.

$6^1$-O-p-tolysulfonylcyclomaltoheptaose is obtained with an average yield of 30%, but is not completely pure since it is contaminated by di- and tri-tosylates.

J. Defaye et al. [(Carbohydr. Res. 192 (1989), 251–258) described an improvement in this technique with which it is possible to obtain this derivative with improved purity and a yield of 26%.

This improvement essentially consists of modifying the proportions of reagents and the reaction time.

Another approach to obtain $6^1$-O-p-tolysulfonylcyclomaltoheptaose was put forward by K. Takahashi et al. in Tetrahedron Lett. 25 (1984) 3331–3334, then by R. C. Petter et al. in J. Am. Chem. Soc. 112 (1990) 3860–3868.

It uses the same reagent, p-toluenesulfonyl chloride in solution in acetonitrile, which is added to a solution of β-cyclodextrin in water containing sodium hydroxide.

After 2 h at ambient temperature, a precipitate is obtained which essentially contains $6^1$-O-p-tolysulfonylcyclomaltoheptaose.

After recrystallization, this compound is obtained with a yield of 11% and distinctly improved purity compared with the method which uses pyridine as solvent (m.p. 179° C. compared with 160–162° C. for the method in pyridine).

The results by K. Takahashi et al, published in Tetrahedron Lett., 25 (1984) 3331–3334 indicate that this low yield is probably associated with lack of the reagent's selectivity leading to cyclodextrin derivatives substituted at C-2 and C-3.

The two main techniques for monosulfonylation of cyclodextrins, in particular of β-cyclodextrin, described above are illustrated in the following diagram:

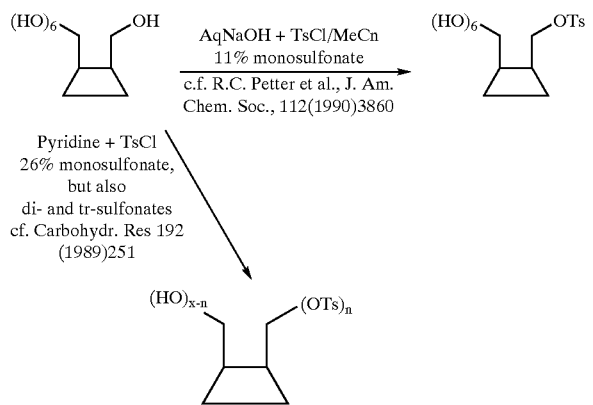

These two above-mentioned methods in the literature both lead to poor yields which do not exceed 30% for the method which uses pyridine, and 11% for the method conducted in water in the presence of sodium hydroxide.

The $6^1$-O-p-tolysulfonylcyclomaltoheptaose obtained is, however, markedly purer with the second method.

Moreover, the method in water is economically more advantageous for industrial applications than the method which uses pyridine.

The overall yields are however too low in both cases to contemplate industrial application of either of the methods.

A need therefore exists for a selective method to prepare monosulfonylated derivatives of cyclodextrins and in particular of β-cyclodextrin, with which it is possible to obtain improved selectivity and therefore an increased global yield of $6^1$-sulfonylated derivatives of cyclodextrin, and in particular of $6^1$-sulfonylated derivatives of β-cyclodextrin.

A further needs exists for a method which, in addition, leads to an end product of high purity, with a minimum number of simple steps, and which uses reagents that are easily available and low-cost.

The purpose of the invention is to provide a regioselective method for preparing monosulfonylated derivatives of cyclodextrins, and in particular of β-cyclodextrin (cyclomaltoheptaose) which, among others, meets these needs and which does not have the disadvantages, defects, limitations and drawbacks of the methods of the prior art, and which brings a solution to the problems raised by the methods of the prior art.

This purpose, and others, are reached according to the invention by a regioselective method for preparing a cyclodextrin derivative monosulfonylated at C-6, in which said cyclodextrin is caused to react with a sulfonylation agent, in an alkaline aqueous solution, in the presence of a metal salt able to form a coordination complex with the secondary hydroxyl groups of the cyclodextrin, and after the reaction said cyclodextrin derivative monosulfonylated at C-6 is recovered from the reaction mixture.

Said cyclodextrin is chosen from among the α-, β-, and γ-cyclodextrins; β-cyclodextrin being preferred.

Compared with the methods of the prior art, and in particular compared with the method in water described in the publication by R. C. PETTER et al., the method of the invention surprisingly offers improved regioselectivity and yield since, in respect of β-cyclodextrin, the average yield of end product is generally between 45 and 50%, and may reach 60%.

Good results are also obtained with α- and γ-cyclodextrins, but yields however are generally lower.

The product obtained is moreover of high purity, that is to say generally more than 95% during the first crystallization.

In addition, the solvent used is water which is extremely advantageous compared with the use of organic solvents such as pyridine; it is to be noted that even though water is used as solvent, in exceedingly surprising manner the method improves the yields which are very low with the in-water methods of the prior art.

Finally, the method of the invention is simple and has the advantage of only comprising one essential step, and of only using routine reagents that are easily available and relatively low cost, which makes the method economically very advantageous for industrial application.

The inventors have been able to demonstrate, using molecular modeling, correlated with elementary analysis and NMR spectroscopy results, that the sulfonylation agent, such as p-toluenesulfonyl chloride, reacts with the cyclodextrin, for example with β-cyclodextrin, by prior inclusion in its cavity.

When the reaction is conducted in pyridine, the topology of inclusion involves exclusive entry of the reagent via the opening of the primary hydroxyls, the pyridine initially included being moved from its inclusion complex that is energetically less favoured, by the side of the secondary hydroxyls.

When the reaction is conducted in water, this sequence of events is inoperative and the reagent is able to be included by both sides of the cavity, which leads to the experimental observation of distribution at C-6 but also at C-2 and C-3 of the tosyl substituents, and to low sulfonylation yields at C-6.

The specific reaction conditions of the method of the invention overcome these difficulties and promote entry of the sulfonylation agent, for example of the arylchlorosulfonylated reagent, via the side of the primary hydroxyls of the cyclodextrin, of β-cyclodextrin for example.

Research by Y. Matsui et al. in Bull. Chem. Soc. Jpn., 48 (1975) 2187–2191 showed that copper (II) in an aqueous alkaline medium could interact with α- and β-cyclodextrins by forming co-ordination complexes having a stoicheiometry of 2:1 involving the secondary hydroxyls of the cyclodextrin.

The formation of such complexes was confirmed in the solid state by X-ray crystallography studies made by P. Klüfers et al and R. Fuchs et al. and reported in Chem. Eur. J. 3 (1997) 601–608 and Angew. Chem. Int. Ed. Engl, 32 (1993) 852–854, respectively.

These authors reveal an interaction of "sandwich" type between the copper (II) and the surfaces of the secondary hydroxyls of the two molecules of cyclodextrins in the solid state.

The inventors have found that the formation of stable complexes between the metal such as copper (II) and the cyclodextrin under the conditions of the method of the invention, by masking the opening of the secondary hydroxyls of the cyclodextrin, is able to improve the selectivity of inclusion of the sulfonylation agent, such as the arylchlorosulfonylated reagent, via the opening of the primary hydroxyls, and therefore to improve the final yield of the desired derivative, for example the $6^1$-arylsulfonylate derivative.

The taking to advantage of the formation of such complexes to improve the selectivity of sulfonylation at the primary hydroxyls is fully surprising, and has been neither described nor suggested in the prior art in which the use of these complexes for regioselective synthesis is absolutely not mentioned.

The method of the invention is illustrated in the following diagram in respect of a sulfonylation agent formed of tosyl chloride and a metal salt formed of copper sulfate.

The interaction of the secondary hydroxyls of the cyclodextrin with the copper hydroxide can be seen.

In this diagram the "sandwich" type interaction is shown, but the interaction may also involve the participation of a single cyclodextrin molecule with the metal ions, copper ions in particular.

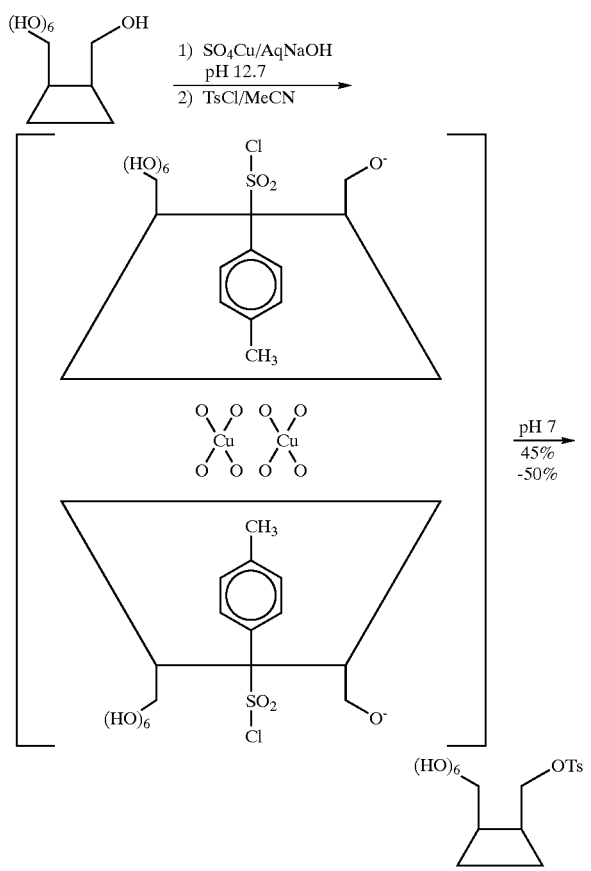

The sulfonylation agent may be any sulfonylation agent known to persons skilled in the art, but is preferably chosen from among the alkyl- and aryl-sulfonyl chlorides, the alkyl group containing for example from 1 to 3 C such as the methyl group or isopropyl group, and the aryl group containing for example from 6 to 10 C, such as the phenyl group, the naphtyl group . . . ; this aryl group possibly being substituted by one or more substituents such as the alkyl or alcoxy groups with 1 to 9 C such as methyl, isopropyl, methoxy etc . . .

The substituted aryl group is further preferably paratoluene sulfonyl chloride (tosyl chloride).

The metal salt able to form a coordination complex with the secondary hydroxyl groups of the cyclodextrin, such as β-cyclodextrin, is generally chosen from among lithium, lead and copper salts; copper salts being preferred.

Said metal salt able to form a coordination complex with the primary hydroxyl groups is generally chosen for example from among this metal's nitrate and sulfate.

The preferred salt is copper sulfate which more easily forms the copper hydroxide participating in the complex, therefore gives the best yields, and is moreover low cost.

According to the invention, the reaction takes place in an alkaline aqueous solution, that is to say that the solvent used is water and not for example pyridine as in some methods of the prior art.

The pH of the alkaline aqueous solution forming the reaction medium is preferably 8 or more; the preferred pH range is 12, 7–12,8 for which the best yield in end product is generally obtained.

The alkaline pH is obtained by adding a base such as sodium hydroxide in the form of an aqueous solution to the reaction medium.

It is possible, in order to produce the reaction, to proceed for example in the following manner: first a solution of cyclodextrin is prepared, for example β-cyclodextrin, in water at a concentration of for example 5 to 20% by weight, then are successively added to this solution first a solution of metal salt in water at a concentration for example of 10 to 60 g/l, then a base solution (NaOH for example) in water at a concentration of 10 to 25 g/l for example.

The mixture obtained is shaken, preferably at ambient temperature, for 5 to 30 minutes for example, then to the homogeneous mixture is added, preferably drop by drop, a solution of sulfonylation agent at a concentration of for example 80 to 225 g/l in a suitable solvent, for example in acetonitrile.

This addition may be continued for a time interval of 30 minutes to 1 h 30 for example. After the addition and mixing of the reagents, and in order to continue and complete the reaction, the reaction mixture is then maintained at a temperature generally of 15 to 30° C., preferably at ambient temperature, for a time of 3 to 6 hours for example, preferably 4 to 5 hours.

In order to recover the cyclodextrin derivative monosulfonylated at C-6 from the reaction mixture after the reaction, the following succession of steps is generally carried out:

the reaction mixture is neutralized, generally through the addition of an acid, hydrochloric acid for example, preferably diluted, in order to raise its pH close to 7; neutralization leads to metal salt precipitation, the precipitate of metal salt is separated using any suitable liquid-solid separation technique, for example by filtration, an aqueous solution of a cyclodextrin derivative monosulfonylated at C-6 is thus obtained, which may optionally be submitted to a further separating operation in order to remove all traces of metal salt remaining in solution, and to produce a generally limpid aqueous solution.

It is possible for example to shake the aqueous solution derived from filtration in the presence of an ion exchange resin, the aqueous solution of cyclodextrin derivative monosulfonylated at C-6 and free of metal salt is then concentrated, for example by lyophilization, to 50 to 75% of its initial volume for example, preferably 2/3 of its initial value, causing crystallization of the desired compound which is collected by filtration for example, then generally washed for example in acetone and ether and finally dried.

Optionally the end product, which is the cyclodextrin derivative monosulfonylated at C-6, is then purified, for example by one or more recrystallizations, preferably in water.

The method of the invention, by making it possible to prepare with high, unsurpassed yield, C-6 monosulfonylated derivatives of cyclodextrins, of β-cyclodextrin in particular, such as the $6^1$-mono-p-toluenesulfonates of β-cyclodextrin, provides much improved economic access to $6^1$-amino-$6^1$-deoxycyclo-maltoheptaose and to $6^1$-deoxy-$6^1$-isothiocyanato-cyclomaltoheptaose, the compulsory precursors of the monothiourea derivatives described for example in patent application PCT/FR 97/00449.

The method of the invention hence generally finds application in the developed use of cyclodextrins, in the fields of supramolecular chemistry, vectoring and bioavailability of medicinal products, encapsulation of perfumes, flavourings, chiral separation, etc . . .

Other characteristics and advantages of the invention will be better seen on reading the following example given for illustration purposes and which is non-restrictive:

EXAMPLE

Preparation of $6^1$-O-p-tolysulfonylcyclomaltoheptaose

To a solution of β-cyclodextrin (11.35 g, 10 mmol) in water (500 ml) are successively added a solution of copper sulfate (7.5 g, 30 mmol) in water (750 ml), then a solution of sodium hydroxide (10 g, 250 mmol) in water (500 ml).

The mixture is shaken at ambient temperature for 10 min (pH 12.7) then a solution of p-toluenesulfonyl chloride (15 g, 79 mmol) in acetonitrile (100 ml) is added drop by drop over a period of 1 h 15.

The reaction mixture is then maintained at ambient temperature for 4 h 30.

The dark blue solution obtained is neutralized using 1 N hydrochloric acid (60 ml). A precipitate of turquoise blue colour appears which is eliminated by filtering.

In the event that traces of copper salts should still remain in solution, they may be removed by shaking the aqueous solution in the presence of Duolite® GT-73 exchange resin.

The limpid solution is concentrated by lyophilization to ⅔ of its initial volume. The $6^1$-O-p-tolysulfonylcyclomaltoheptaose which crystallizes is recovered by filtration and washed in acetone (2×40 ml) and ether (2×30 ml) and dried (7.1 g).

After 2 recrystallizations in water, 6.33 g(48%) of product is obtained, m.p. 190–192° C. $[\alpha]D^{20}+122°$ (c 4, Me$_2$SO). The physical constants for the same product are m.p. 160–162° C. $[\alpha]D^{20}+118°$ (c 4, Me$_2$SO) in Carbohydr. Res., 192 (1989) 251–258 and m.p. 179° C. $[\alpha]D^{23}+50.7°$ in J. Am. Chem. Soc. 112 (1990) 3860–3868.

The $^1$H and $^{13}$C NMR data are identical to those described in the literature by R. C. Petter et al., J. Am. Chem. Soc. 112 (1990) 3860–3868.

This example exhibits the high yield obtained with the method of the invention, and the high purity of the end product.

What is claimed is:

1. A regioselective method for preparing a cyclodextrin derivative monosulfonylated at C-6, in which said cyclodextrin is reacted with a sulfonylation agent, in an alkaline aqueous solution, in the presence of a metal salt able to form a coordination complex with the secondary hydroxyl groups of the cyclodextrin, and after the reaction said cyclodextrin derivative monosulfonylated at C-6 is recovered from the reaction mixture.

2. The method according to claim 1, in which said cyclodextrin is chosen from the α-, β- or γ-cyclodextrins.

3. The method according to claim 1, in which said sulfonylation agent is chosen from the aryl- and alkyl-sulfonyl chlorides, said aryl group optionally being substituted by one or more substituents.

4. The method according to claim 3, in which said sulfonylation agent is paratoluene-sulfonyl chloride (tosyl chloride).

5. The method according to claim 1, in which said metal salt able to form a co-ordination complex with the secondary hydroxyl groups of cyclodextrin is chosen from lithium, copper and lead salts.

6. The method according to claim 5, in which said metal salt is a nitrate or a sulphate of said metal.

7. The method according to claim 6, in which said salt is copper sulfate.

8. The method according to claim 1, in which said alkaline aqueous solution has a pH of 12.7 to 12.8.

9. The method according to claim 1, in which the reaction is produced by addition and mixing of reagents and maintaining the reaction mixture at a temperature of 15 to 30° C. for a period of 3 to 6 hours in order to continue and complete the reaction.

10. The method according to claim 1, in which after the reaction, in order to recover said cyclodextrin derivative monosulfonylated at C-6, the reaction mixture is neutralized to precipitate the metal salt, the precipitate of metal salt is separated, the aqueous solution obtained of cyclodextrin derivative monosulfonylated at C-6 that is free of metal salt is concentrated, and the cyclodextrin derivative monosulfonylated at C-6 which crystallizes is collected and optionally purified.

11. The method of claim 1, wherein said salt is a copper salt.

12. The method of claim 1, wherein the yield of the monosulfonylated cyclodextrin is between 45 and 60%.

13. The method of claim 1, wherein the pH of the aqueous solution is 8 or more.

14. The method of claim 1, wherein the cyclodextrin is a β-cyclodextrin.

15. The method of claim 1, wherein the sulfonylation agent forms an inclusion complex with the cyclodextrin prior to its reaction with the cyclodextrin.

16. The method of claim 1, wherein said salt is copper sulfate.

* * * * *